United States Patent
Ricaud et al.

[11] 3,706,286
[45] Dec. 19, 1972

[54] CONVEYOR SYSTEMS

[72] Inventors: Pierre Ricaud, 78 Chatou; Simon Cynober, 75 Paris 11e, both of France

[73] Assignee: Jeumont-Schneider, Paris, France

[22] Filed: Dec. 31, 1970

[21] Appl. No.: 103,195

[30] Foreign Application Priority Data

Dec. 30, 1969 France..............................6945392

[52] U.S. Cl..............................................104/172 S
[51] Int. Cl.............................................B65g 17/42
[58] Field of Search..........................104/172 S, 178

[56] References Cited

UNITED STATES PATENTS

| 3,451,352 | 6/1969 | Curry et al. | 104/172 S |
| 3,602,148 | 8/1971 | Swartz | 104/172 S |

*Primary Examiner*—Gerald M. Forlenza
*Assistant Examiner*—Robert Saifer
*Attorney*—Raymond A. Robic

[57] ABSTRACT

The invention is a conveying system formed of a first track having several load-bearing trucks movably mounted thereon, a second track which supports a driving chain continuously movable thereon and having several first dogs depending from the chain. The load-bearing trucks have a first abutment device which is engaged by the first dogs of the driving chain to be driven by it. There is a mechanism, on the trucks for disengaging the first abutment device from the first dogs so as to free the load-bearing trucks. The system also comprises a third track that carries at least one driving vehicle movable thereon at a speed greater than that of the load-bearing trucks and that has a second dog. The load-bearing trucks carry a second abutment device which can be hit by the second dog to actuate the disengaging mechanism and thus free the first abutment device from the dogs of the driving chain and allow the load-bearing trucks to be moved at a greater speed by the driving vehicle of the third track. The first abutment device of each load-bearing truck also has a provision whereby it may again be engaged by the first dogs of the driving chain if the speed of the load-bearing truck falls below that of the driving chain.

10 Claims, 5 Drawing Figures

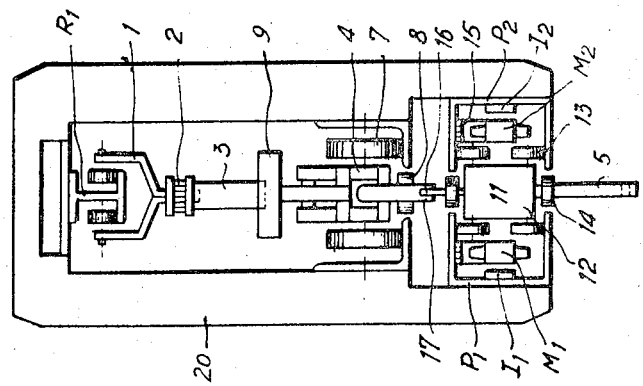
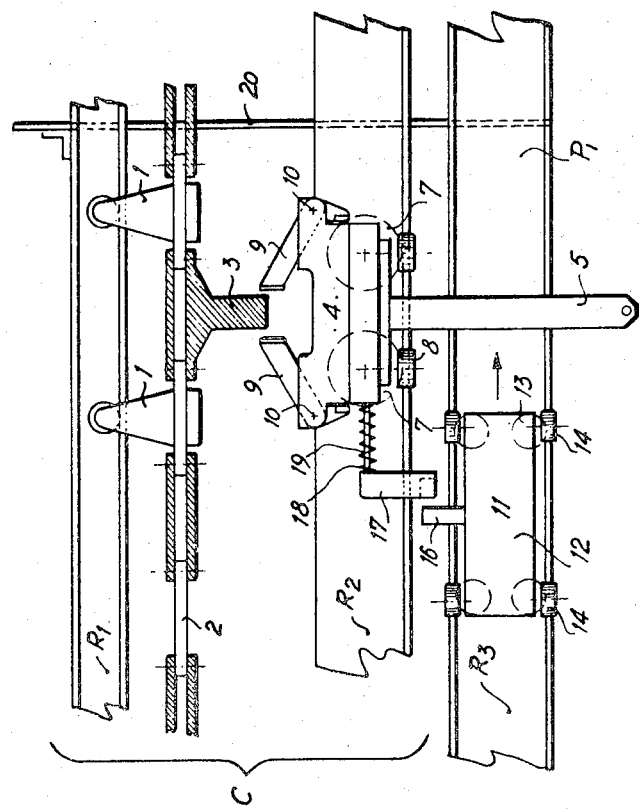
INVENTORS
Pierre RICAUD
Simon CYNOBER
ATTORNEY

CONVEYOR SYSTEMS

The present invention relates to improvements in conveyor systems.

Twin rail chain conveyors comprise two circuits which are arranged one above the other, firstly a drive circuit comprising a track, trolleys and a chain with pusher dogs, the chain being driven by a driving unit, and secondly a carrier or support circuit comprising an appropriately shaped beam serving as a track for trucks bearing loads to be handled. To interconnect the two circuits, driving or pusher dogs rigidly secured to the chain engage between retractable abutments on the trucks. There are a number of ways for disengaging a dog from the truck abutments so that the corresponding truck can be placed on stand-by or can travel on a special path, as at a switch or junction, or so that the loads can be stored or given particular machining or inspection operations. One way is to separate the drive circuit and the carrier circuit from one another. The fact that the trucks can be disengaged in this way from their drive chain and that the speed thereof and therefore of the trucks in engagement therewith can be varied makes the dual duty conveyor and advantageous choice for many purposes.

Performance could be improved considerably in many cases if the speed of a truck or group of trucks normally in engagement with the chain could deliberately and in some zones be briefly increased above the speed of the other trucks, for truck distribution along the chain could then be generally optimized to suit the particular circumstances of use. For instance, at start-up of the conveyor the speed of the first trucks could be increased so as to reduce waiting times at the unloading stations furtherest away from the loading stations; the between-trucks spacing on a circuit could be standardized at any desired and therefore irregular value so that inter alia truck distribution at unloading stations could be evened out; trucks in transit could accumulate so as to be stored or so as to be unloaded continuously; and the mean throughput of the conveyor could be increased temporarily.

The present invention relates mainly to an improvement in handling conveyors, the improvement residing in associating with the conveyors over all or some of their path at least one extra drive circuit co-operating with such conveyors to give the same the advantages previously mentioned.

According to the present invention, there is provided a conveyor system having a first track on which the load-bearing trucks move and a second tract for supporting a moving driving chain which is provided with a plurality of first dogs. The load-bearing trucks have first abutment means against which the first dogs engage to propel the trucks at the speed of the chain, the said trucks being provided with means for disengaging the first dogs from the first abutment means. The system also comprises a third track that carries one or more second dogs. The load-bearing trucks have second abutment means engageable with the second dog or dogs to cause the operation of the means for disengaging, from the first dogs, the first abutment means when acted upon by the second dogs so that the trucks can be propelled by the said second dogs at a rate which is faster than that of the driving chain. The load-bearing trucks are also provided with means that enable their disengagement with the driving chain when their speed falls below that of the first dogs. Finally, a damping system is disposed between each load-bearing truck and its second abutment.

The present invention will now be described in greater detail by way of example with reference to the accompanying drawings, wherein:

FIG. 1 is a view in elevation (with the front parts of the tracks removed) of an overhead twin rail chain conveyor system and associated extra drive circuit;

FIG. 2 is an end view of the conveyor system shown in FIG. 1;

Figure 3:
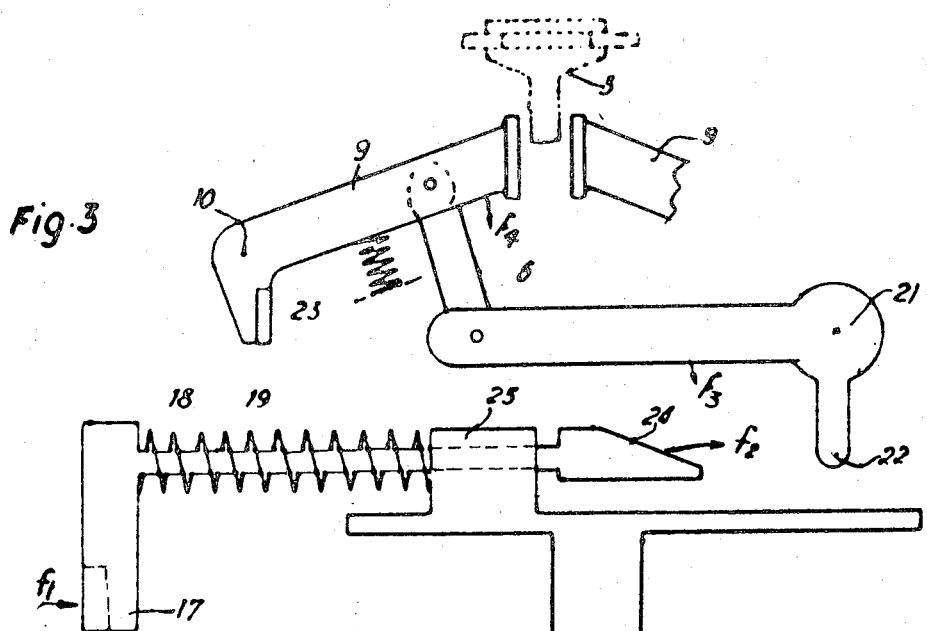
FIG. 3 shows a decoupling device by means of which the load-bearing trucks can be uncoupled from the driving chain.

Referring to FIGS. 1 and 2, a conveyor C is of the kind having two tracks $R_1$ and $R_2$ disposed one above another. Running on the top track $R_1$ are trolleys 1 bearing a moving chain 2 having secured to it at intervals pusher or drive dogs 3 for driving trucks 4, each having a downwardly projecting vertical member 5 for receiving a load to be handled. The truck 4 is in the form of a box having two pairs of running rollers 7 and two guide rollers 8. The truck 4 has two inwardly facing abutments 9 which are substantially T-shaped and resemble a gun hammer. These abutments 9 pivot around spindles 10 which are suitably biased by springs (not shown) so as to return them to the uppermost position as shown in FIG. 1. A dog 3, after first temporarily depressing the first abutment 9 it encounters, engages between the abutments 9, so that the chain 2, which is driven by a drive unit (not shown) can propel the truck 4 along.

Below the truck track $R_2$ is a third track $R_3$ which comprises two section members $P_1$, $P_2$ in which moves an electro-magnetically propelled truck 11 having a double linear induction motor such as the one described in the specification of U.S. Pat. application Ser. No. 79,942, filed Oct. 10, 1970. The three tracks $R_1$, $R_2$ and $R_3$ are secured to one another at intervals by stirrup-shaped or portallike members 20.

The truck 11 has a central box 12 and two field magnets $M_1$, $M_2$ which are secured back-to-back. The field magnets have spindles for four pairs of running rollers 13 and two pairs of guide rollers 14. The field magnets $M_1$ and $M_2$ are connected to an electric power supply wiring by means of rubbing contacts 15. Armatures $I_1$ and $I_2$ are secured to the inside surface of the section members $P_1$ and $P_2$ respectively and magnetically co-operate through an air-gap with the field magnets $M_1$ and $M_2$.

FIG. 3 is a detailed view of a decoupling device arranged on a truck 4 which enables the truck 4 to be decoupled from the chain 2 and driven at a faster rate than the chain 2 by means of a truck 11. The decoupling device includes an abutment 17, an integrally formed rod 19 and a spring 18 coiled around the rod 19 arranged to slide through a block 25 secured to the truck. The rod 19 carries an actuating member 24 having an inclined surface 40. When the dog 16 of a truck 11 abuts the abutment 17 in the direction indicated by the arrow $f_1$, the spring 18 is compressed and the actuating member 24 moves in the direction indicated by the arrow $f_2$ and pivots one arm 22 of a bell cranked lever around a stationary spindle 21 in the direction indicated by the arrow $f_3$. The end of the other arm of the bell cranked lever is pivotally connected to the rear abutment 9 by means of a lever 6. The rear abutment 9 of the truck 4 is therefore pivoted around the stationary spindle 10 in the direction indicated by the arrow $f_4$, so the biassing spring 23 is compressed. Since the rear abutment 9 has now been depressed below the chain dog 3, the truck 4 can be driven by a truck 11 at a faster rate than it could be driven by the chain 2.

The decoupling device just described can be operated not only by means of the dog 16 of a truck 11 but also in the event of another truck 4 contacting the particular truck 4 being considered. Should the decoupling device not be required to operate in this latter manner, abutments could be disposed at the front of truck 4 to prevent full compression of the spring 18.

The overhead conveyor system shown in FIGS. 1 and 2 operates as follows. Assuming that to start with some of the trucks 4 are being driven slowly by the chain 2, and that an express truck 11 is being driven electromagnetically at a faster rate. When the truck 11 catches up a truck 4, its dog 16 engages the abutment 17 on the truck 11 and thereby compresses the spring 18 to disengage the rear abutment 9 from the dog 3, so that the truck 4 is then driven at the speed of the truck. Any subsequent dogs 3 are passed by since the front abutment 9 is merely depressed by each dog in turn. Any other trucks 4 in front can be picked up, the decoupling device being operated by the leading truck 4 in the train.

Figure 4:
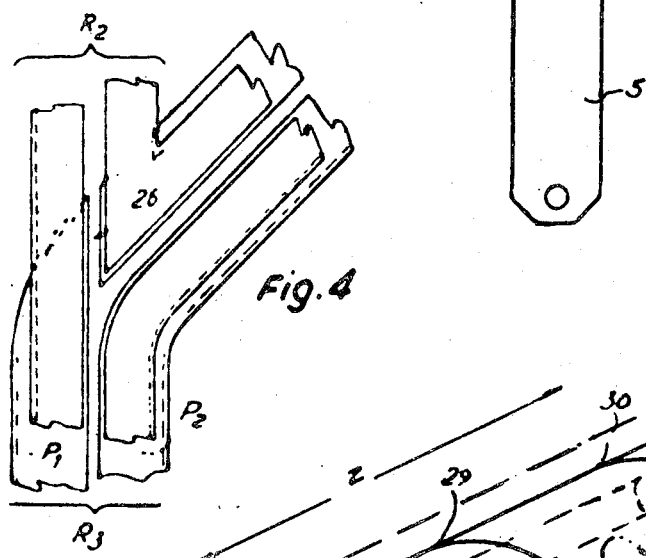
FIG. 4 shows a gap in one of the section members of the extra track so that the truck hanger can pass by at a switch.

When the speed of the train comprising a truck 11 and one or more trucks 4 is reduced to below the speed of the chain 2, the first dog 3 to pass by engages with the butt of the front a abutment 9 and drives the truck or trucks 4, the same releasing from the truck 11. The trucks 4 can then take a different path as determined by an extra circuit. As can be seen in FIG. 4, at the entry and exit of the express section parallel to track $R_2$ one of the members $P_1$ is formed with a gap 26 through which the hanger 5 can pass.

If the express truck 11 is required to cease operations at a number of places in accordance with installation operating requirements, the express track can have junctions which, in the example under consideration, can be of the kind without moving blades described in the Specification of our copending U.S. Pat. application Ser. No. 79,942. These junctions may or may not be matched by carrier-track junctions which can be either conventional or of the kind disclosed in the specification of U.S. copending application Ser. No. 878,758 filed Nov. 21, 1969.

Figure 5:
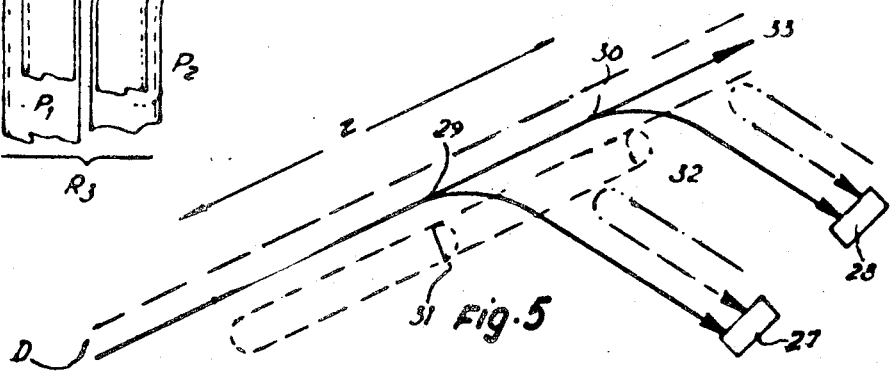
FIG. 5 is a lay-out of one preferred circuit for the various tracks of a conveyor system according to the invention.

FIG. 5 shows one preferred form on installation of an improved conveyor system. The carrier-track circuits ($R_2$) are shown in solid line, the slow-track circuits ($R_1$) are shown in chain-dotted line and the express-track circuits ($R_3$) are shown in broken line. There are junctions at places 29–32. The trucks 4 are loaded at a place D; they stack up to some extent in zone Z, where the express track extends beside the carrier track, and the trucks either go on in the direction indicated by an arrow 33 or are directed to distribution stations 27 or 28. Switching to the express track can precede switching to the carrier track so that the truck 4 negotiates this passage slowly, or else these two switches can be in local agreement, in which event the express truck 11 transfers the load truck 4 from the main conveyor upstream to the secondary conveyor downstream.

Many modifications may be made without departing from the scope of the invention. For example, some of the drive circuit of a dual duty conveyor can be replaced by an express track having an electro-magnetically propelled truck having as entraining means only a single dog disposed like the dogs of the slow circuit. The express circuit need not be closed on itself, in which event the trucks 4 are driven consecutively by a reciprocating motion of the dog 16. The same can be associated with retracting means. The conveyor system can be used as an inverted conveyor with the slow-speed chain circuit disposed under or on the floor, the load-bearing trucks 4 running on the floor and the express circuit being disposed either substantially at floor lever or overhead, in which event the connection between a load-bearing truck and the moving dog of the express track can be provided by a readily releasable rod. The conveyor can follow a path other than level, provided that operating or built-in precautions are provided to prevent overspeeding of descending load trucks. One way of achieving this is for the load truck 4 to disengage from the extra-drive truck 11 before descent, for instance, by the truck 11 being either retarded or switched to a siding.

The improved conveyor system described above is of use for the continuous handling of separate loads in all cases where an overhead conveyor must be used either for functional or operational reasons whenever a variable build-up speed on the load-carrying track is required, for instance, to achieve a substantially continuous distribution in time at one end of the conveyor despite random arrivals in time at the other end, the load-carrying track then serving as a variable-accumulation storage track.

We claim:

1. A conveyor system having a first track on which load-bearing trucks move; a second track for supporting a moving driving chain; a plurality of first dogs arranged on the driving chain; first abutment means arranged on the load-bearing trucks against which the first dogs can engage for propelling the trucks at the speed of the chain; means for disengaging the first dogs from the first abutment means; a third track carrying one or more second dogs; second abutment means provided on the load-bearing trucks for engaging the second dog or dogs, said second abutment means causing the operation of the means for disengaging the first abutment means from the first dogs when acted upon by the second dogs so that the truck can be propelled by the second dogs at a rate faster than the driving chain, and means enabling the engagement of the trucks with the driving chain when the speed of the trucks falls below that of the first dogs.

2. A conveyor system according to claim 1 including a damping system disposed between each load-bearing truck and its second abutment means.

3. A conveyor system according to claim 1, wherein each of the second dogs are mounted on a respective second truck which is arranged to be propelled along the third track.

4. A conveyor system according to claim 3, wherein the second trucks are electro-magnetically propelled.

5. A conveyor system according to claim 4, wherein each second truck carries a pair of field magnets on either side thereof which are arranged to form air-gaps with armatures arranged along the third track.

6. A conveyor system according to claim 1, wherein each first truck carries a pair of pivotally arranged inwardly facing abutment members constituting the first abutment means, arranged so that on engagement with the first dogs one is depressed and the other is propellingly engaged therewith according to relative motion between the truck and the chain.

7. A conveyor system according to claim 6, wherein that abutment member which would be propellingly engaged by a first dog when the speed of the truck is greater than the speed of the chain is, when the truck is propelled by a second dog, associated with the disengaging means whereby it is depressed to prevent such engagement and thus permits the truck to continue to travel at a faster rate than that of the chain.

8. A conveyor system according to claim 7, wherein said second abutment means can be moved by the second dogs against the action of a spring to cause the disengaging means to depress the abutment member to prevent the engagement by the first dogs.

9. A conveyor system according to claim 8, wherein the disengaging means includes a bell cranked lever which is rocked about a pivot by the spring loaded second abutment means acting on one arm of the bell cranked lever, whereas the end of the other arm is connected to abutment member through a further lever.

10. A conveyor system comprising:
 a. a first track and load-bearing trucks movably mounted thereon;
 b. a second track and a driving chain movably mounted thereon, said chain having a plurality of first dogs spacedly mounted thereon;
 c. first abutment means on said load-bearing trucks disposed for engagement by said first dogs to be driven by and at the speed of said chain;
 d. means on said load-bearing trucks for releasing said first dogs from engagement with said first abutment means;
 e. a third track and at least one second truck having one second dog for alternate driving of said load-bearing trucks, said second truck mounted on said third track for movement at a speed normally greater than that of said driving chain;
 f. second abutment means on said load-bearing trucks disposed for engagement by said second dog and for actuation of said releasing means;
 g. wherein said second abutment means is intended to actuate said releasing means when abutting said second dog to free said first dogs from said first abutment means whereby said load-bearing trucks can be propelled by said second truck, and
 h. wherein said first abutment means include reengagement means suitable to cause reengagement of said load-bearing trucks by said first dogs whenever the speed of said load-bearing trucks when propelled by said second truck falls below that of said driving chain.

* * * * *